United States Patent
Joung et al.

(10) Patent No.: US 9,380,583 B1
(45) Date of Patent: Jun. 28, 2016

(54) METHOD OF ADJUSTING COVERAGE OF SMALL CELL FOR EFFICIENT USE OF CELL RESOURCES

(71) Applicant: INNOWIRELESS CO., LTD., Gyeonggi-do (KR)

(72) Inventors: Jin Soup Joung, Gyeonggi-do (KR); Seung Hwan Ji, Gyeonggi-do (KR); Beom-Sik Kim, Gyeonggi-do (KR); Sang-lk Cho, Gyeonggi-do (KR)

(73) Assignee: INNOWIRELESS CO., LTD. (KR)

( * ) Notice: Subject to any disclaimer, the term of this patent is extended or adjusted under 35 U.S.C. 154(b) by 0 days.

(21) Appl. No.: 14/643,084

(22) Filed: Mar. 10, 2015

(30) Foreign Application Priority Data

Dec. 30, 2014 (KR) .......................... 10-2014-0193146

(51) Int. Cl.
*H04W 72/04* (2009.01)
(52) U.S. Cl.
CPC .................................. *H04W 72/048* (2013.01)
(58) Field of Classification Search
CPC ... H04W 16/20; H04W 16/00; H04W 72/048; H04W 72/00; H04W 72/04
USPC ........................................................ 455/452.1
See application file for complete search history.

(56) References Cited

U.S. PATENT DOCUMENTS

| 8,509,780 | B2 * | 8/2013 | Sridhar ............. | H04W 36/0083 370/310.2 |
|---|---|---|---|---|
| 2013/0252620 | A1 * | 9/2013 | Kobayashi .......... | H04W 52/325 455/446 |
| 2014/0235218 | A1 * | 8/2014 | Hahn .................... | H04W 16/26 455/418 |
| 2015/0085753 | A1 * | 3/2015 | Chen ..................... | H04W 16/08 370/328 |

FOREIGN PATENT DOCUMENTS

| KR | 1020090062192 A | 6/2009 |
|---|---|---|
| KR | 1020110042508 A | 4/2011 |
| KR | 1020120045554 A | 5/2012 |

* cited by examiner

*Primary Examiner* — Marisol Figueroa
(74) *Attorney, Agent, or Firm* — Kaplan Breyer Schwarz & Ottesen LLP (57) ABSTRACT

A method of adjusting the coverage of a small cell for efficient use of cell resources in which the position of user equipment (UE) in the small cell is estimated using timing advance information of the UE, and the coverage is adjusted in consideration of a load state of the cell and a channel state of the UE.

7 Claims, 6 Drawing Sheets

METHOD OF ADJUSTING COVERAGE OF SMALL CELL FOR EFFICIENT USE OF CELL RESOURCES

CROSS-REFERENCE TO RELATED APPLICATION

This application claims priority to and the benefit of Korean Patent Application No. 10-2014-0193146, filed on Dec. 30, 2014, the disclosure of which is incorporated herein by reference in its entirety.

FIELD OF THE INVENTION

The present invention relates to a method of adjusting the coverage of a small cell, and more particularly, to a method of adjusting the coverage of a small cell which makes it possible to estimate the position of user equipment (UE) in the small cell using timing advance information of the UE and to efficiently use cell resources in consideration of a load state of the cell and a channel state of the UE.

BACKGROUND OF THE INVENTION

Figure 1:
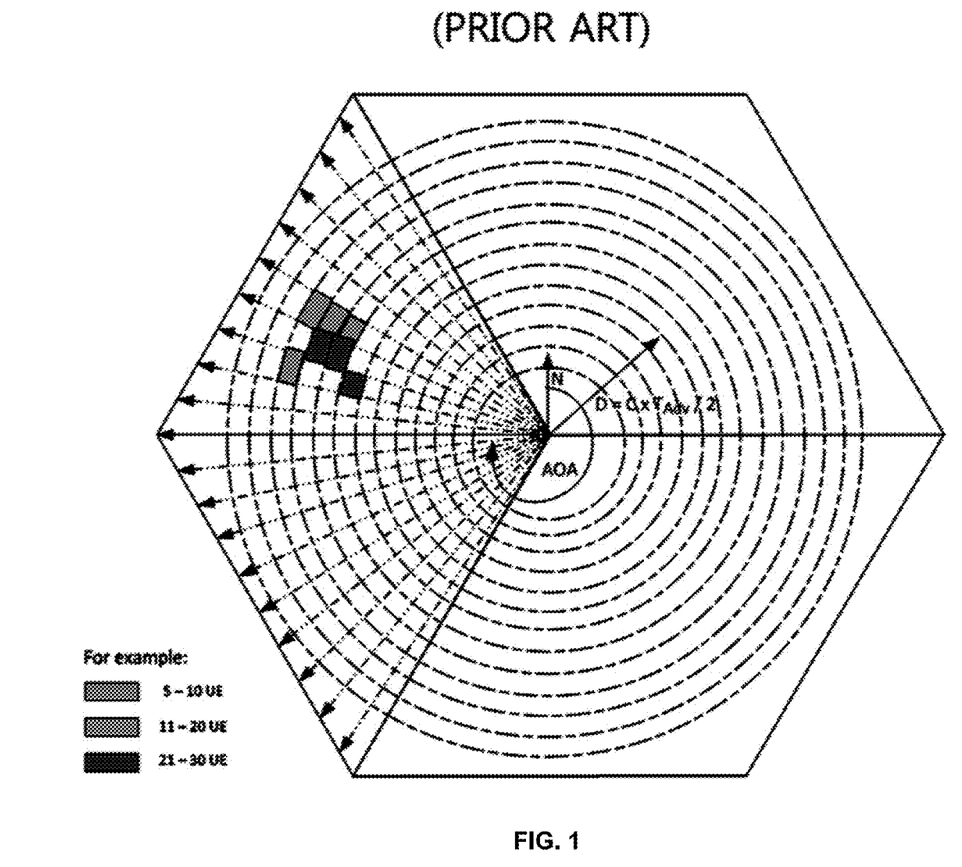
FIG. 1 is an outline diagram of coverage and capacity optimization (CCO) in a self-organizing network specified in third generation partnership project (3GPP) technical report (TR)

As a related art of the present invention, FIG. 1 illustrates coverage and capacity optimization (CCO) in a self-organizing network specified in third generation partnership project (3GPP) technical report (TR). As a use case of CCO, the 3GPP TR proposes a technology in which a small cell base station periodically observes two-dimensional (2D) distribution of UE in the cell and adjust coverage, and defines use of the timing advance Taw and the angle of arrival (AOA) of UE for the purpose. However, according to this technology, when pieces of UE are in motion, calculation of the AOA is complicated, and also coverage holes may be generated, which may cause a discontinuous service.

Figure 2:
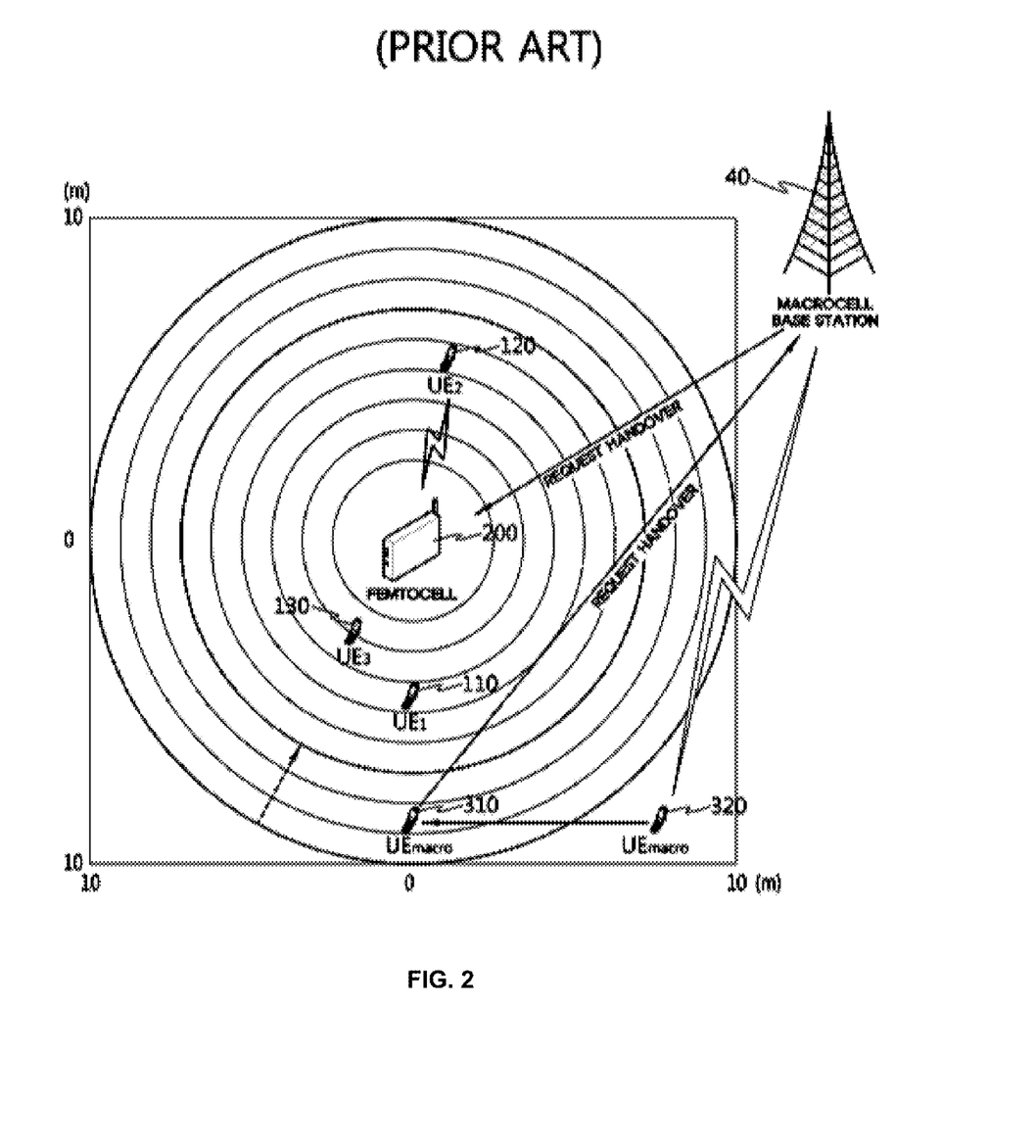
FIG. 2 illustrates configurations of a power setting method and femtocell base station and user equipment (UE) technology for the power setting method.

As another related art of the present invention, FIG. 2 illustrates a power setting method and femtocell base station and UE technology for the power setting method disclosed in Korean Unexamined Patent Application Publication No. 10-2011-0042508. This technology is characterized by a method of setting power in a femtocell base station including an operation of setting initial power to set femtocell coverage, an operation of receiving a handover request message from macrocell UE, an operation of acquiring the position of at least one piece of femtocell UE which is communicating within the femtocell coverage, and an operation of setting transmission power to increase or decrease every 1 m based on the position of the at least one piece of femtocell UE communicating within the femtocell coverage. However, this technology is configured to adjust transmission power based on only the position of femtocell UE, and thus the capacity of a femtocell base station cannot be optimally used. Also, in a place in which pieces of UE are concentrated (e.g., a sports field), overload may occur in a femtocell base station, or the femtocell base station may malfunction to repeatedly increase and decrease transmission power.

Figure 3:
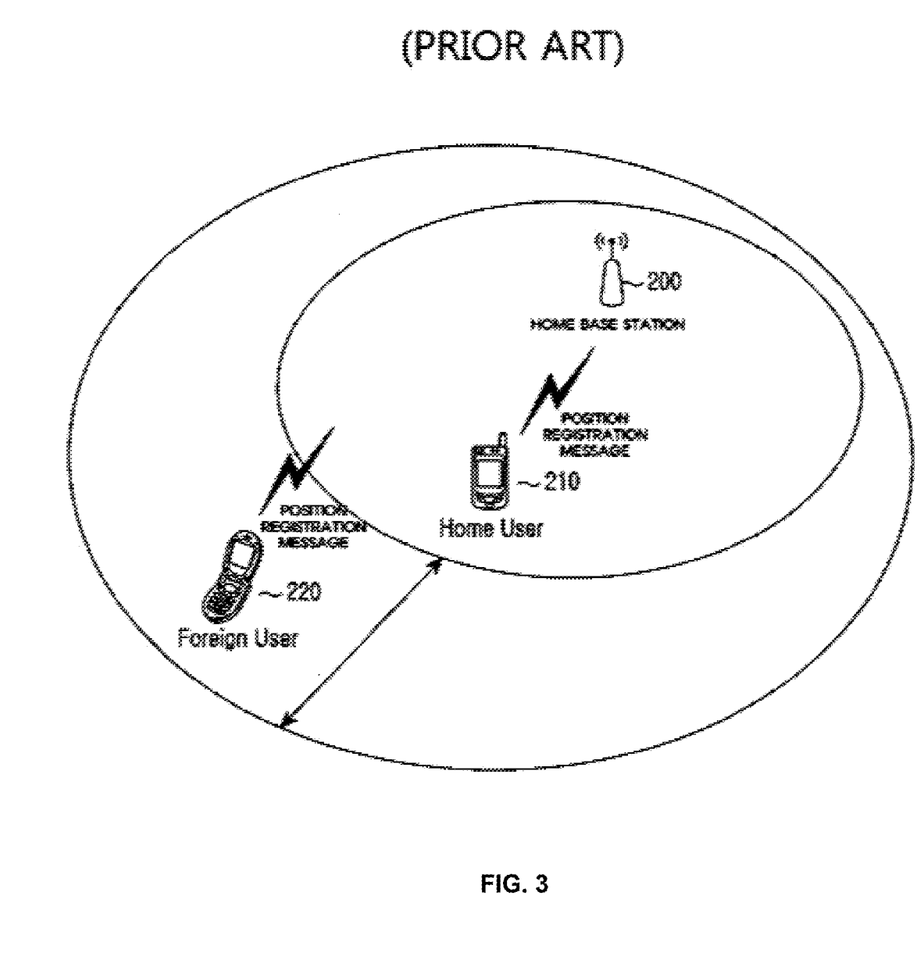
FIG. 3 illustrates configurations of an apparatus and method for output power control of a home base station.

As still another related art of the present invention, FIG. 3 illustrates an apparatus and method for output power control of a home base station disclosed in Korean Unexamined Patent Application Publication No. 10-2009-0062192. This technology includes a process of determining the type of a user who has transmitted a position registration message when the position registration message is received, a process of calculating a maintenance power when the type of the user is a home user, and a process of increasing an optimal output power value to be applied to a home base station by a difference between the maintenance power and the most recently calculated power for avoiding interference when the maintenance power is not greater than the interference avoidance power. However, according to this technology, it is necessary to perform an additional operation of UE, and it is not possible to optimally use the capacity of a home base station because a maintenance power value is calculated based on the most recently calculated interference avoidance power.

This work was supported by the ICT R&D program of MSIP/IITP, Republic of Korea. [13-911-05-001, Development of OpenFlow-based integrated management system for wired and wireless network]

RELATED DOCUMENTS

1. Korean Patent Publication No. 10-2011-0042508
2. Korean Patent Publication No. 10-2009-0062192
3. Korean Patent Publication No. 10-2012-0045554

SUMMARY OF THE INVENTION

The present invention is directed to a method of adjusting the coverage of a small cell which makes it possible to estimate the position of user equipment (UE) in the small cell using timing advance information of the UE and to efficiently use cell resources in consideration of a load state of the cell and a channel state of the UE.

According to an aspect of the present invention, there is provided a method of adjusting coverage of a small cell for efficient use of cell resources, the method including: finding, by a small cell access point (AP), the number of pieces of UE in a small cell, and expanding the coverage when the number of pieces of UE in the small cell is equal to or smaller than the maximum of the number of pieces of UE for expanding the coverage; and estimating, by the small cell AP, current coverage and positions of the pieces of UE in the small cell when it is determined that the number of pieces of UE in the small cell is within a range from the maximum of the number of pieces of UE for expanding the coverage to the minimum of the number of pieces of UE for shrinking the coverage, and shrinking, by the small cell AP, the coverage when it is determined that the number of users satisfying an edge user condition is equal to or larger than a threshold of the number of users for shrinking the coverage.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION

Following description only exemplifies the principle of the present invention. Although the description of the principle may not be clear or all possible embodiments of the present invention are not illustrated in the specification, those of ordinary skill in the art can embody the principle of the present invention and invent various apparatuses within the scope and concept of the present invention. In principle, all conditional terms and embodiments described in the specification are intended to make the concept of this invention understood, and the present invention should be understood not limited to the described embodiments or conditions only. Also, it is to be appreciated that not only the principles, viewpoints, and embodiments of the present invention, but all detailed descriptions listing the particular embodiments are intended to include structural and functional equivalents thereof.

The aforementioned objectives, features, and advantages will further be clarified by the detailed description. In describing the present invention, detailed description of related art will be omitted when it is deemed to unnecessarily obscure the gist of the invention. Hereinafter, exemplary embodiments of the present invention will be described in detail with reference to the accompanying drawings.

A small cell is a base station that covers a smaller area than an existing mobile communication base station (macrocell), and has a lower transmission power, a smaller hardware configuration, and a lower data processing capability than a macrocell. In general, a small cell is installed at a random position by a user, and thus it is not possible to set coverage as intended by a network provider. Therefore, a small cell requires an operating method for sensing surroundings and autonomously setting optimal coverage.

A small cell is installed to overlap its coverage and the coverage of a macrocell, and provides improved spectral efficiency per unit area to improve average performance experienced by users. However, when the coverage of a small cell installed in macrocell coverage is excessively small, only a very small number of users are connected to the small cell. In this case, it is not possible to expect any actual gain from installation of the small cell. On the other hand, when the coverage of a small cell is too large, too many users may be connected in comparison with the capacity of the small cell, and the problem of overload may occur. In this case, coverage edge users who are allocated a relatively large number of radio bearers (RBs) compared to the amount of data in use due to a low modulation and coding scheme (MCS) may degrade efficiency of cell resources. To prevent these problems caused by cell coverage, when the coverage of a small cell is too small, it is necessary to expand the coverage so that a larger number of users can be connected to the small cell, and when the coverage of a small cell is too large, it is necessary to shrink the coverage so that some of coverage edge users are handed over to a macrocell.

An exemplary embodiment of the present invention provides a method of adjusting the coverage of a small cell which makes it possible to estimate the position of user equipment (UE) in the small cell using timing advance information of the UE and to efficiently use cell resources in consideration of a load state of the cell and a channel state of the UE.

To this end, in the exemplary embodiment of the present invention, the position of the UE in the small cell, a load state of the cell, a channel state of the UE, etc. are calculated after parameters shown in the following table are set in a small cell access point (AP).

TABLE 1

| Small cell AP parameter | |
| --- | --- |
| Notation | Description |
| r_max | Maximum of coverage size of small cell |
| r_min | Minimum of coverage size of small cell |
| N_sh | Minimum of number of pieces of UE for shrinking coverage |
| N_ex | Maximum of number of pieces of UE for expanding coverage |
| N_max | Maximum of number of pieces of UE in small cell |
| P_max | Maximum downlink (DL) output power of small cell |
| P_min | Minimum DL output power of small cell |
| t_interval | Time interval in which coverage adjustment is performed |
| ΔP | Power adjustment unit for coverage adjustment |
| PLm(d) | Pathloss estimation function from macrocell |
| PLs(r) | Pathloss estimation function from small cell |
| Δr | Range for determining cell edge users |
| N_edgeThresh | Threshold of number of cell edge users for shrinking coverage | r_max and r_min are the maximum and the minimum of coverage (radius) set in the small cell AP, and are determined according to the performance of the small cell AP and the surroundings of adjacent cells. For example, the coverage of a small cell in which r_max is set to 10 m and r_min is set to 3 m has a radius from a minimum of 3 m to a maximum of 10 m. When the output power of the small cell AP is high enough, r_max can be increased. On the other hand, when it is necessary to consider interference with adjacent cells, the small cell AP may reduce r_max. Also, when there are few adjacent cells or the capacity of the small cell AP is high enough, r_min may be increased.

N_sh is the minimum of the number of pieces of UE for shrinking the coverage. In other words, when the number of pieces of UE is equal to or larger than N_sh, the small cell AP performs an operation for shrinking the coverage. Also, when the number of pieces of UE is smaller than the maximum N_ex of the number of pieces of UE for expanding the coverage, the small cell AP performs an operation for expanding the coverage.

P_max and P_min are maximum and minimum transmission powers that can be used by the small cell AP, and need to be set to maximum and minimum transmission powers that can be used without any problem with hardware standards. Therefore, coverage adjustment according to the exemplary embodiment of the present invention is achieved by adjusting the transmission power of the small cell AP within a range from P_min to P_max.

t_interval is a period at which the small cell AP performs a coverage adjustment procedure of a single step. In other words, the small cell AP performs an operation for coverage adjustment at time intervals of t_interval. Here, a transmission power adjustment step of coverage adjustment performed at the time intervals is ΔP.

PLm(d) is a pathloss estimation function from a macrocell when the macrocell and the small cell AP are disposed at a distance of d, and PLs(r) is a pathloss estimation function from the small cell at a distance of r from the small cell. The estimation functions are intended to estimate the coverage of the small cell and are determined according to an installation environment of the small cell.

Δr is a range for determining coverage edge users. UE within a distance of Δr from the coverage of the small cell AP is determined as a coverage edge user.

N_edgeThresh is a threshold of the number of coverage edge users for shrinking the coverage. When the number of coverage edge users is larger than N_edgeThresh, the small cell AP shrinks the cell coverage. N_edgeThresh may be determined according to the capacity of the small cell AP.

A method of adjusting the coverage of a small cell for efficient use of cell resources according to an exemplary embodiment of the present invention provides the following operations according to the number of pieces of UE in the small cell.

TABLE 2

Operation according to number of pieces of UE in small cell

| Case | Operation |
| --- | --- |
| N_sh ≤ N_UE ≤ N_max | Shrink coverage (cell shrinking) |
| N_ex < N_UE < N_sh | Maintain coverage |
| 0 ≤ N_UE ≤ N_ex | Expand coverage (cell expanding) |

When a number N_UE of pieces of UE connected to the small cell is larger than N_sh, the small cell AP shrinks the coverage, and when the number N_UE of pieces of UE connected to the small cell is smaller than N_ex, the small cell AP expands the coverage. Also, when the number N_UE of pieces of UE does not correspond to the two cases, the small cell AP maintains the current coverage.

Figure 4:
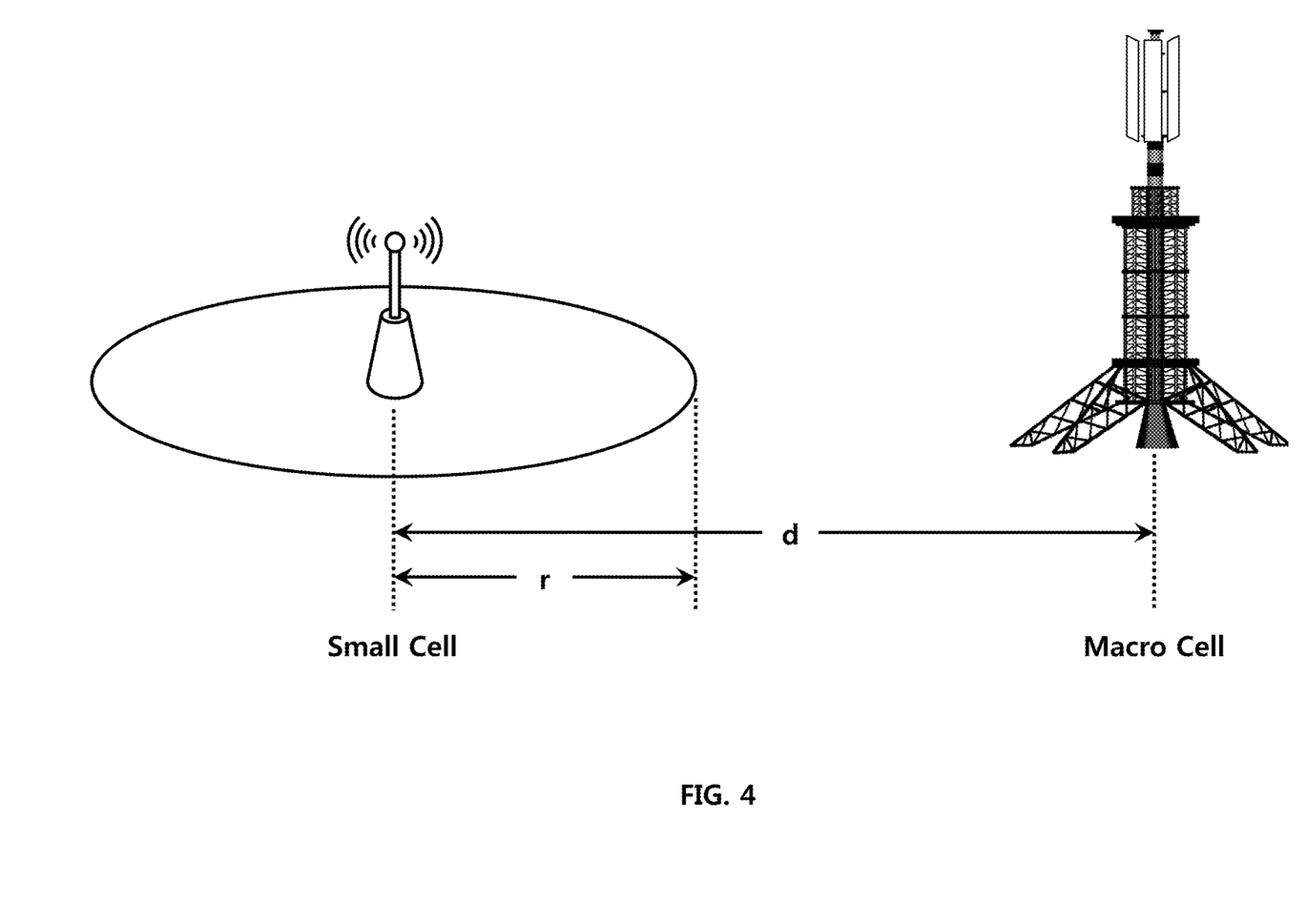
FIG. 4 shows a coverage model of a macrocell and a small cell.

FIG. 4 shows a coverage model of a macrocell and a small cell. A small cell AP can estimate current coverage using a reference signal received power (RSRP) value received from a macrocell and a reference signal (RS) transmission power value of the small cell AP. The coverage estimation is divided into a first operation of estimating the distance between the macrocell and the small cell, and a second operation of estimating the coverage of the small cell according to the RS power value of the small cell.

The first operation of estimating the distance between the macrocell and the small cell is as follows. First, the small cell can measure an RSRP from the macrocell using a sniff function, and extract an RS transmission power value of the macrocell by decoding a system information block (SIB) 2 of the macrocell. When a pathloss estimation function with respect to a distance d from the macrocell to the small cell is PLm(d), a relational expression among the received RSRP, the RS transmission power, and the pathloss estimation function is as shown in Expression 1 below.

$$P\_RS.m - RSRPm(d) = PLm(d) \quad \text{[Expression 1]}$$

P_RS.m: RS transmission power of the macrocell
RSRPm(d): RSRP at a position apart from the macrocell by the distance d Therefore, using the inverse function of the pathloss estimation function, it is possible to calculate the distance d between the macrocell and the small cell AP as follows.

$$d = PLm^{-1}(P\_RS.m - RSRPm(d)) \quad \text{[Expression 2]}$$

Using the distance d estimated through the above process, it is possible to calculate a coverage r of the small cell. At the edge of the small cell coverage, an RSRP received from the macrocell is identical to an RSRP received from the small cell AP, which can expressed as follows.

$$RSRPm(d-r) = RSRPf(r) \quad \text{[Expression 3]}$$

Since an RSRP equals a value obtained by subtracting a pathloss from an RS transmission power, the above expression is rearranged as Expression 4 below.

$$PRS.m - PLm(d-r) = PRS.f - PLf(r) \quad \text{[Expression 4]}$$

Therefore, the coverage r of the small cell can be calculated from Expression 4 above.

Figure 5:
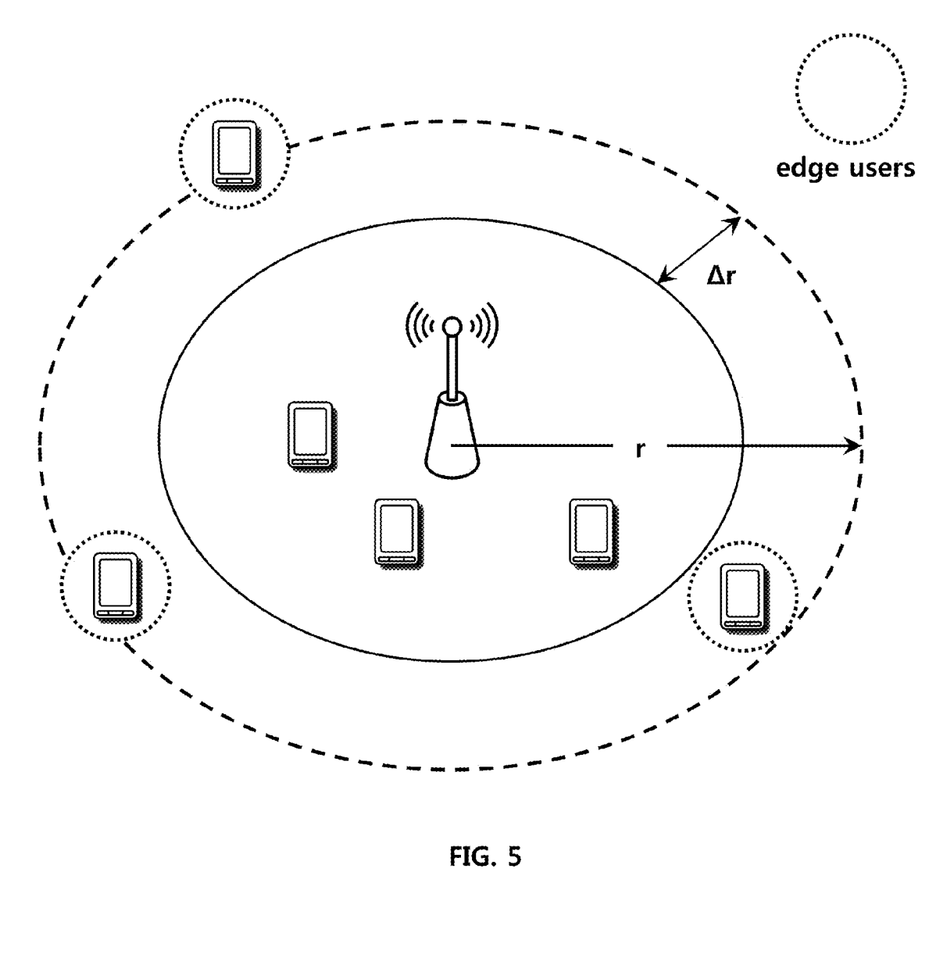
FIG. 5 shows a user position estimation and edge user determination model according to an exemplary embodiment of the present invention.

FIG. 5 shows a user position estimation and edge user determination model according to an exemplary embodiment of the present invention. The distance between a small cell AP and UE in a small cell can be estimated using timing advance information which is a time difference between the transmission time point of a DL signal transmitted by the small cell AP and the reception time point of an uplink (UL) signal received by the small cell AP. When a timing advance value for UE i is TA.i, an estimated distance di between the UE i and the small cell can be expressed as the following expression.

$$di = 1/2(TA.i*c): c \text{ is the speed of light}, 3.0 \times 10^8 \text{ m/s} \quad \text{[Expression 5]}$$

The small cell AP calculates the estimated distance di between the UE i and the small cell using Expression 5 above, and then determines whether or not each piece of UE is an edge user. When the distance from the coverage edge to the UE i is shorter than Δr, the small cell AP determines that the corresponding UE as an edge user. Therefore, conditions for determining an edge user can be defined as the following expressions.

$$di > (r - \Delta r)$$

$$1/2(TA.i*c) > (r - \Delta r)$$

$$TA.i > 2/c(r - \Delta r) \quad \text{[Expression 6]}$$

The small cell AP determines edge users through the above process, and then shrinks the cell coverage stage by stage when the number N_UE of pieces of UE is equal to or larger than N_sh and the number of users satisfying the edge user conditions is equal to or larger than Nedge.Thresh. These conditions are expressed as follows.

$$N\_sh \le N\_UE \le N\_max \text{ and } Nedge \ge Nedge.Thresh \quad \text{[Expression 7]}$$

When the conditions for shrinking the cell coverage are satisfied, the small cell AP calculates an RS transmission power candidate value PRS.candidate within the maximum/minimum coverage range that is applicable. To shrink the coverage, a transmission power is reduced by ΔP per the unit time interval t_interval. The transmission power candidate value PRS.candidate is calculated by the following expression.

$$PRS.\text{candidate} = \max(\min(PRS.\max\_cov, PRS - \Delta P), PRS.\min\_cov) \quad \text{[Expression 8]}$$

In Expression 8, PRS.max_cov and PRS.min_cov are RS transmission power values satisfying the set maximum and minimum coverage, respectively, and are calculated by the following expressions.

$$PRS.\max\_cov = PRS.m - PLm(d-r\_\max) + PLf(r\_\max)$$

$$PRS.\min\_cov = PRS.m - PLm(d-r\_\max) + PLf(r\_\min) \quad \text{[Expression 9]}$$

A final RS transmission power needs to be determined in consideration of the maximum/minimum transmission power that can be provided by the small cell AP. Therefore, a final RS transmission power for shrinking the cell coverage is determined through the following expression.

$$PRS.\text{set} = \max(\min(PRS.\max, PRS.\text{candidate}), PRS.\min \quad \text{[Expression 10]}$$

In a method of adjusting the coverage of a small cell for efficient use of cell resources according to an exemplary embodiment of the present invention, when the number N_UE of pieces of UE in the small cell is equal to or smaller than N_ex, the cell coverage is expanded stage by stage. This condition is expressed as the following expression.

$$0 \leq N\_UE \leq N\_ex \qquad \text{[Expression 11]}$$

When the conditions for expanding the cell coverage is satisfied, the small cell AP calculates the RS transmission power candidate value PRS.candidate within the maximum/minimum coverage range that is applicable. To expand the coverage, the transmission power is increased by ΔP per the unit time interval t_interval. The transmission power candidate value PRS.candidate is calculated by the following expression.

$$PRS.\text{candidate} = \max(\min(PRS.\max\_cov, PRS+\Delta P), PRS.\min\_cov) \qquad \text{[Expression 12]}$$

In Expression 12, PRS.max_cov and PRS.min_cov are RS transmission power values satisfying the set maximum and minimum coverage, respectively, and are calculated by the following expressions.

$$PRS.\max\_cov = PRS.m - PLm(d-r\_\max) + PLf(r\_\max)$$

$$PRS.\min\_cov = PRS.m - PLm(d-r\_\max) + PLf(r\_\min) \qquad \text{[Expression 13]}$$

A final RS transmission power needs to be determined in consideration of the maximum/minimum transmission power that can be provided by the small cell AR Therefore, a final RS transmission power for expanding the cell coverage is determined by the following expression.

$$PRS.\text{set} = \max(\min(PRS.\max, PRS.\text{candidate}), PRS.\min) \qquad \text{[Expression 14]}$$

Therefore, in a method of adjusting the coverage of a small cell for efficient use of cell resources according to an exemplary embodiment of the present invention, cell coverage is repeatedly adjusted to be maintained, shrinked, or expanded at the unit time intervals t_interval.

Figure 6:
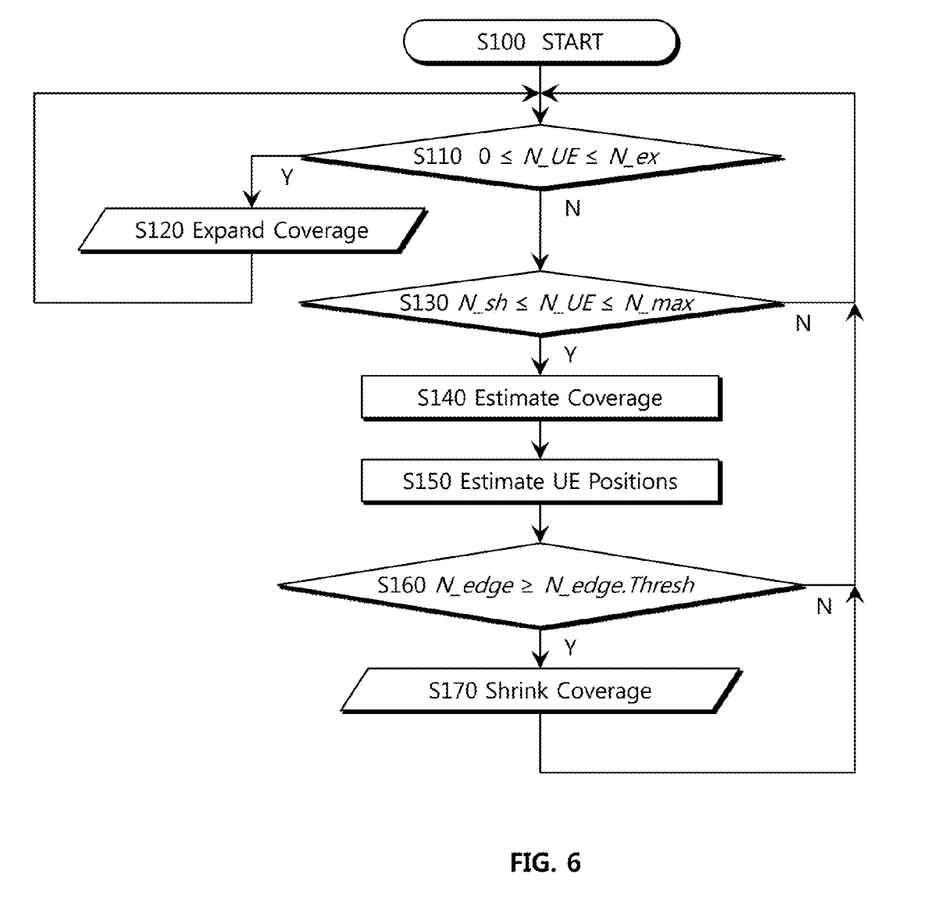
FIG. 6 is a flowchart illustrating a method of adjusting the coverage of a small cell for efficient use of cell resources according to an exemplary embodiment of the present invention.

FIG. 6 is a flowchart illustrating a method of adjusting the coverage of a small cell for efficient use of cell resources according to an exemplary embodiment of the present invention. The flowchart is repeatedly performed by a small cell AP at set unit time intervals t_interval. The flowchart will be described below according to operations.

S100: Operation of a small cell AP starts.

S110: The small cell AP finds a number N_UE of pieces of UE in the small cell, and determines whether the number N_UE of pieces of UE in the small cell is equal to or smaller than a maximum N_ex of the number of pieces of UE for expanding the coverage.

S120: When it is determined in operation S110 that the number N_UE of pieces of UE in the small cell is equal to or smaller than N_ex, the small cell AP expands the coverage, and performs the process again beginning with operation S110.

S130: When it is determined in operation S110 that the number N_UE of pieces of UE in the small cell is neither equal to nor smaller than N_ex, the small cell AP determines whether the number N_UE of pieces of UE in the small cell is within a range from the maximum N_ex of the number of pieces of UE for expanding the coverage to a minimum N_sh of the number of pieces of UE for shrinking the coverage, and performs the process again beginning with operation S110 if the number N_UE of pieces of UE in the small cell is not within the range from N_ex to N_sh.

S140: When it is determined in operation S130 that the number N_UE of pieces of UE in the small cell is within the range from N_ex to N_sh, the small cell AP estimates current coverage.

S150: The small cell AP estimates the positions of pieces of UE in the small cell.

S160: The small cell AP determines whether a number N_edge of users satisfying edge user conditions is equal to or larger than a threshold Nedge.Thresh of the number of cell edge users for shrinking the coverage, and performs the process again beginning with operation S110 when N_edge is neither equal to nor larger than Nedge.Thresh.

S170: When it is determined in operation S160 that N_edge is equal to or larger than Nedge.Thresh, the small cell AP shrinks the coverage, and performs the process again beginning with operation S110.

The operation S140 in which the small cell AP estimates the current coverage is performed as follows.

When a pathloss estimation function with respect to a distance d from a macrocell to the small cell is PLm(d), a relational expression among a received RSRP, an RS transmission power, and the pathloss estimation function is found.

$$P\_RS.m - RSRPm(d) = PLm(d) \qquad \text{[Expression 1]}$$

P_RS.m: RS transmission power of the macrocell
RSRPm(d): RSRP at a position apart from the macrocell by the distance d Using the inverse function of the pathloss estimation function, the small cell AP calculates the distance d between the macrocell and the small cell AP.

$$d = PLm^{-1}(P\_RS.m - RSRPm(d)) \qquad \text{[Expression 2]}$$

A condition that an RSRP received from the macrocell is identical to an RSRP received from the small cell AP is applied to the edge of the small cell coverage.

$$RSRPm(d-r) = RSRPf(r) \qquad \text{[Expression 3]}$$

An RSRP equals a value obtained by subtracting a pathloss from an RS transmission power.

$$PRS.m - PLm(d-r) = PRS.f - PLf(r) \qquad \text{[Expression 4]}$$

Therefore, a radius r of the coverage can be calculated using the above expression.

In the operation S150 in which the small cell AP estimates the positions of pieces of UE in the small cell, the small cell AP calculates an estimated distance using a timing advance value for UE i.

$$di = 1/2(TA.i*c): c \text{ is the speed of light}, 3.0 \times 10^8 \text{ m/s} \qquad \text{[Expression 5]}$$

In the operation S150 in which the small cell AP estimates the positions of pieces of UE in the small cell, the small cell AP calculates the estimated distance di between the UE i and the small cell using, and then determines the UE i as an edge user when the distance from the coverage edge to the UE i is shorter than Δr.

In the operation S150 in which the small cell AP estimates the positions of pieces of UE in the small cell, the small cell AP determines the UE i as an edge user based on the following conditions.

$$di > (r - \Delta r)$$

$$1/2(TA.i*c) > (r - \Delta r)$$

$$TA.i > 2/c(r - \Delta r) \qquad \text{[Expression 6]}$$

Based on the conditions, the small cell AP determines whether or not the distance from the coverage edge to the UE i is shorter than Δr.

In the operation S170 in which the small cell AP shrinks the coverage, the small cell AP shrinks the coverage by reducing a transmission power by ΔP per the unit time interval t_interval. Using Expression 8 below, the small cell AP calculates an RS transmission power candidate value PRS.candidate within the maximum/minimum coverage range that is applicable.

$$PRS.\text{candidate}=\max(\min(PRS.\max\_cov, PRS-\Delta P), PRS.\min\_cov) \quad \text{[Expression 8]}$$

A final RS transmission power for shrinking the cell coverage is calculated using the following expression and applied.

$$PRS.\text{set}=\max(\min(PRS.\max, PRS.\text{candidate}), PRS.\min) \quad \text{[Expression 10]}$$

In the operation S120 in which the small cell AP expand the coverage, the small cell AP expands the coverage by increasing the transmission power by $\Delta P$ per the unit time interval t_interval. Using Expression 12 below, the small cell AP calculates the RS transmission power candidate value PRS.candidate within the maximum/minimum coverage range that is applicable.

$$PRS.\text{candidate}=\max(\min(PRS.\max\_cov, PRS+\Delta P), PRS.\min\_cov) \quad \text{[Expression 12]}$$

A final RS transmission power for expanding the cell coverage is calculated using the following expression and applied.

$$PRS.\text{set}=\max(\min(PRS.\max, PRS.\text{candidate}), PRS.\min) \quad \text{[Expression 14]}$$

As described above, in a method of adjusting the coverage of a small cell for efficient use of cell resources according to an exemplary embodiment of the present invention, the position of UE is estimated in a small cell using timing advance information of the UE, and the coverage of the small cell is adjusted in consideration of a load state of the cell and a channel state of the UE. Therefore, it is possible to efficiently use cell resources.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A method of adjusting coverage of a small cell for efficient use of cell resources, the method comprising:
    operation (S100) of starting an operation of a small cell access point (AP);
    operation (S110) of finding, by the small cell AP, a number N_UE of pieces of user equipment (UE) in the small cell, and determining whether the number N_UE of pieces of UE in the small cell is equal to or smaller than a maximum N_ex of a number of pieces of UE for expanding the coverage;
    operation (S120) of expanding, by the small cell AP, the coverage and performing the method again beginning with operation (S110) when it is determined in operation (S110) that the number N_UE of pieces of UE in the small cell is equal to or smaller than N_ex;
    operation (S130) of determining, by the small cell AP, the number N_UE of pieces of UE in the small cell is within a range from the maximum N_ex of the number of pieces of UE for expanding the coverage to a minimum N_sh of a number of pieces of UE for shrinking the coverage when it is determined in operation (S110) that the number N_UE of pieces of UE in the small cell is neither equal to nor smaller than N_ex, and performing the method again beginning with operation (S110) when the number N_UE of pieces of UE in the small cell is not within the range from N_ex to N_sh;
    operation (S140) of estimating, by the small cell AP, current coverage when it is determined in operation (S130) that the number N_UE of pieces of UE in the small cell is within the range from N_ex to N_sh;
    operation (S150) of estimating, by the small cell AP, positions of the pieces of UE in the small cell;
    operation (S160) of determining, by the small cell AP, whether a number N_edge of users satisfying edge user conditions is equal to or larger than a threshold Nedge_Thresh of a number of cell edge users for shrinking the coverage, and performing the method again beginning with operation (S110) when N_edge is neither equal to nor larger than Nedge Thresh; and
    operation (S170) of reducing, by the small cell AP, the coverage when it is determined in operation (S160) that N_edge is equal to or larger than Nedge_Thresh, and performing the method again beginning with operation (S110).

2. The method of claim 1, wherein operation S140 of estimating, by the small cell AP, the current coverage comprises:
    finding a relational expression among a received reference signal received power (RSRP), a reference signal (RS) transmission power, and a pathloss estimation function when the pathloss estimation function with respect to a distance d from a macrocell to the small cell is PLm(d)

$$P\_RS.m - RSRPm(d) = PLm(d) \quad \text{[Expression 1]}$$

where P_RS.m is an RS transmission power of the macrocell, and
RSRPm(d) is an RSRP at a position apart from the macrocell by the distance d;
    calculating the distance d between the macrocell and the small cell AP using an inverse function of the pathloss estimation function $$d = PLm^{-1}(P\_RS.m - RSRPm(d)); \quad \text{[Expression 2]}$$

applying a condition that an RSRP received from the macrocell be identical to an RSRP received from the small cell AP at an edge of the small cell coverage $$RSRPm(d-r) = RSRPf(r); \text{ and} \quad \text{[Expression 3]}$$

calculating a radius r of the coverage using an expression below because an RSRP equals a value obtained by subtracting a pathloss from the RS transmission power $$PRS.m - PLm(d-r) = PRS.f - PLf(r). \quad \text{[Expression 4]}$$

3. The method of claim 1, wherein operation S150 of estimating, by the small cell AP, the positions of the pieces of UE in the small cell comprises calculating, by the small cell AP, an estimated distance di using a timing advance value TA.i for UE i according to an expression below, $$di = 1/2(TA.i * c) \quad \text{[Expression 5]}$$

where c is a speed of light, $3.0 \times 10^8$ m/s.

4. The method of claim 1, wherein operation S150 of estimating, by the small cell AP, the positions of the pieces of UE in the small cell further comprises calculating, by the small cell AP, the estimated distance di between the UE i and the small cell, and then determining, by the small cell AP, the UE i as an edge user when a distance from an edge of the coverage to the UE i is shorter than $\Delta r$.

5. The method of claim 1, wherein operation S150 of estimating, by the small cell AP, the positions of the pieces of UE in the small cell comprises determining the UE i as an edge user when the distance from the edge of the coverage to the UE i is shorter than Δr based on conditions below $$di>(r-\Delta r)$$

$$1/2(TA.i*c)>(r-\Delta r)$$ [Expression 5]

$$TA.i>2/c(r-\Delta r).$$ [Expression 6]

6. The method of claim 1, wherein operation S170 of reducing, by the small cell AP, the coverage comprises:
  decreasing, by the small cell AP, a transmission power by ΔP per a unit time interval t_interval to shrink the coverage;
  calculating, by the small cell AP, a reference signal (RS) transmission power candidate value PRS.candidate within a maximum/minimum coverage range that is applicable using Expression 8 below $$PRS.\text{candidate}=\max(\min(PRS.\max\_cov,PRS-\Delta P),\\ PRS.\min\_cov);$$ [Expression 8]

calculating a final RS transmission power for shrinking the cell coverage using an expression below and applying the calculated final RS transmission power $$PRS.\text{set}=\max(\min(PRS.\max,PRS.\text{candidate}),\\ PRS.\min).$$ [Expression 10]

7. The method of claim 1, wherein operation S120 of expanding, by the small cell AP, the coverage comprises:
  increasing, by the small cell AP, a transmission power by ΔP per a unit time interval t_interval to expand the coverage;
  calculating, by the small cell AP, a reference signal (RS) transmission power candidate value PRS.candidate within a maximum/minimum coverage range that is applicable using Expression 12 below $$PRS.\text{candidate}=\max(\min(PRS.\max\_cov,PRS+\Delta P),\\ PRS.\min\_cov);\text{ and}$$ [Expression 12]

calculating a final RS transmission power for expanding the cell coverage using an expression below and applying the calculated final RS transmission power $$PRS.\text{set}=\max(\min(PRS.\max,PRS.\text{candidate}),\\ PRS.\min).$$ [Expression 14]

* * * * *